: US 10,144,277 B2
(45) Date of Patent: Dec. 4, 2018

(54) VEHICLE TANK

(71) Applicant: AGCO International GmbH, Neuhausen (CH)

(72) Inventors: Markus Braeutigam, Aitrang (DE); Simon Brack, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/693,769

(22) Filed: Sep. 1, 2017

(65) Prior Publication Data

US 2018/0065470 A1 Mar. 8, 2018

(30) Foreign Application Priority Data

Sep. 7, 2016 (GB) .................................. 1615151.6

(51) Int. Cl.
*B60K 11/02* (2006.01)
*B60K 11/04* (2006.01)
*B60K 15/063* (2006.01)
*F01P 3/20* (2006.01)
*F01P 11/10* (2006.01)

(52) U.S. Cl.
CPC .............. *B60K 11/02* (2013.01); *B60K 11/04* (2013.01); *B60K 15/063* (2013.01); *F01P 3/20* (2013.01); *F01P 11/10* (2013.01); *B60Y 2200/221* (2013.01)

(58) Field of Classification Search
CPC ...... B60K 11/02; B60K 11/04; B62D 25/084; F01P 3/18; F01P 3/20; F01P 11/10
USPC .......................... 180/64.4, 64.6; 280/830, 831
See application file for complete search history.

(56) References Cited

U.S. PATENT DOCUMENTS

| | | | | |
|---|---|---|---|---|
| 1,369,540 A * | 2/1921 | Pribula | ............. | B62D 49/0664 |
| | | | | 172/292 |
| 1,458,129 A * | 6/1923 | Curran | ..................... | F01P 7/16 |
| | | | | 123/41.01 |
| 5,928,535 A * | 7/1999 | Trinkner | ............. | B23K 9/1006 |
| | | | | 219/133 |
| 5,931,228 A * | 8/1999 | Kalbacher | ............. | B60K 11/04 |
| | | | | 123/196 AB |
| 6,109,310 A * | 8/2000 | Peotter | ............ | B60K 15/03504 |
| | | | | 141/59 |
| 7,077,228 B1 * | 7/2006 | White | ..................... | B62J 17/00 |
| | | | | 180/219 |

(Continued)

FOREIGN PATENT DOCUMENTS

DE          2834789 A1     2/1980
DE    10 2012020706 A1    4/2014

(Continued)

OTHER PUBLICATIONS

UK Intellectual Property Office, International Search Report for Priority Application No. GB1615151.6 dated Dec. 22, 2016.

(Continued)

*Primary Examiner* — Joseph M Rocca
*Assistant Examiner* — Daniel S Yeagley

(57) ABSTRACT

A vehicle tank having an upper surface for mounting a fan and radiator to which is sloped between the fan and radiator mounting parts so that there is a difference in the relative height of the parts. The tank also has a horizontal lower surface that abuts the chassis or frame of a vehicle and the space between the upper and lower surfaces holds a fluid.

3 Claims, 3 Drawing Sheets

(56) References Cited

U.S. PATENT DOCUMENTS

| | | | |
|---|---|---|---|
| 7,931,397 B2* | 4/2011 | Lindblom | B28C 5/4213 |
| | | | 220/563 |
| 8,613,543 B2* | 12/2013 | Lindblom | B28C 5/4231 |
| | | | 220/636 |
| 2003/0015152 A1 | 1/2003 | Schmitz et al. | |
| 2005/0006161 A1* | 1/2005 | Armstrong | B62J 31/00 |
| | | | 180/219 |
| 2006/0112910 A1* | 6/2006 | Ohzono | F01P 11/0285 |
| | | | 123/41.54 |
| 2007/0175824 A1* | 8/2007 | Togawa | B60K 15/03177 |
| | | | 210/618 |
| 2014/0056675 A1* | 2/2014 | Kitaoka | E02F 9/0866 |
| | | | 414/685 |

FOREIGN PATENT DOCUMENTS

| | | |
|---|---|---|
| EP | 1329682 A2 | 7/2003 |
| EP | 3009624 A1 | 4/2016 |
| JP | 2010070062 A | 4/2010 |
| JP | 2011031888 A | 2/2011 |
| KR | 1020130026635 A | 3/2013 |
| WO | 2015/007914 A1 | 1/2015 |
| WO | 15007914 A1 | 1/2015 |

OTHER PUBLICATIONS

European Patent Office, International Search Report for EP Application No. EP 17 18 6707, dated Feb. 23, 2018.

* cited by examiner

VEHICLE TANK

BACKGROUND

Field of Invention

This invention relates to a tank on a vehicle. More specifically, this invention relates to a tank of a cooling arrangement on an agricultural tractor.

Description of Related Art

Agricultural tractors require a number of radiators at the front of the tractor in order to cool a number of working parts, such as a water cooler and a charge air cooler (CAC) for the engine, a transmission oil cooler and a hydraulic oil cooler. It is common practice to arrange the radiators in a series under the vehicle bonnet so that air from a fan positioned at the front of the tractor drives air through the radiators. Fans are usually hydraulically driven by belt means.

As the trend for larger sized engines increases, so does the requirement for an effective means to cool the engine and its parts. This has led to the requirement for larger sized fans, which in turn require a greater amount of fluid to drive an associated fan belt than previously required. An efficient means to convey cooling air from the fan to the radiators is also necessary.

To concentrate the flow of air from the fan to the first radiator, that is the first radiator downstream of the fan, the fan is usually provided with a fan shroud which projects in a direction towards the radiators. The fan shroud typically borders the circumference of the fan and extends a short distance parallel, or substantially parallel to the longitudinal axis of the vehicle. In a further arrangement disclosed in the applicant's patent application PCT/EP2014/065620 the fan and radiator are mounted in a spaced relationship on a mounting plate so that there is a difference in the relative height between the fan and radiator. A fan shroud extends from the fan to the first radiator so that air is channeled effectively between the shroud and the plate from the fan to the radiator.

However, to work the fan, fluid from fluid tanks on the vehicle, such as from the front axle must be delivered to the fan mechanism. This fluid is conducted by pipes/tubes which adds to the cost of the vehicle and can also create problems due to the lack of space under the bonnet.

It is an aim of the invention to provide a vehicle tank which overcomes; or at least alleviates some of the aforementioned problems associated with a vehicle cooling arrangement.

OVERVIEW OF THE INVENTION

According to the invention, there is provided a vehicle tank comprising an upper outer surface for mounting a fan and radiator thereto, said upper outer surface comprising a sloped surface between a fan mounting surface part and a radiator mounting surface part so that there is a difference in the relative heights of the two mounting surface parts, said tank further comprising a lower outer surface having a horizontal plane for abutment with a chassis or vehicle frame, and wherein the space between said upper and lower outer surfaces provides a space to hold a fluid.

The invention thus provides a tank which supports the fan and radiators and provides a fluid holder which is in close proximity to the fan. This avoids the necessity of having to pipe fluid from other tanks on the tractor to the fan mechanism which saves space on the tractor and time and costs during manufacture.

Preferably, the tank is part of a cooling arrangement of the vehicle. The form of the tank assists in channeling air from the fan to the radiators. More preferably the tank is manufactured by injection molding. The vehicle tank is preferably an agricultural tractor tank.

BRIEF DESCRIPTION OF THE DRAWINGS

The invention will now be described, by way of example only, with reference to the following drawings in which.

DETAILED DESCRIPTION OF EXEMPLARY EMBODIMENTS

Figure 1:
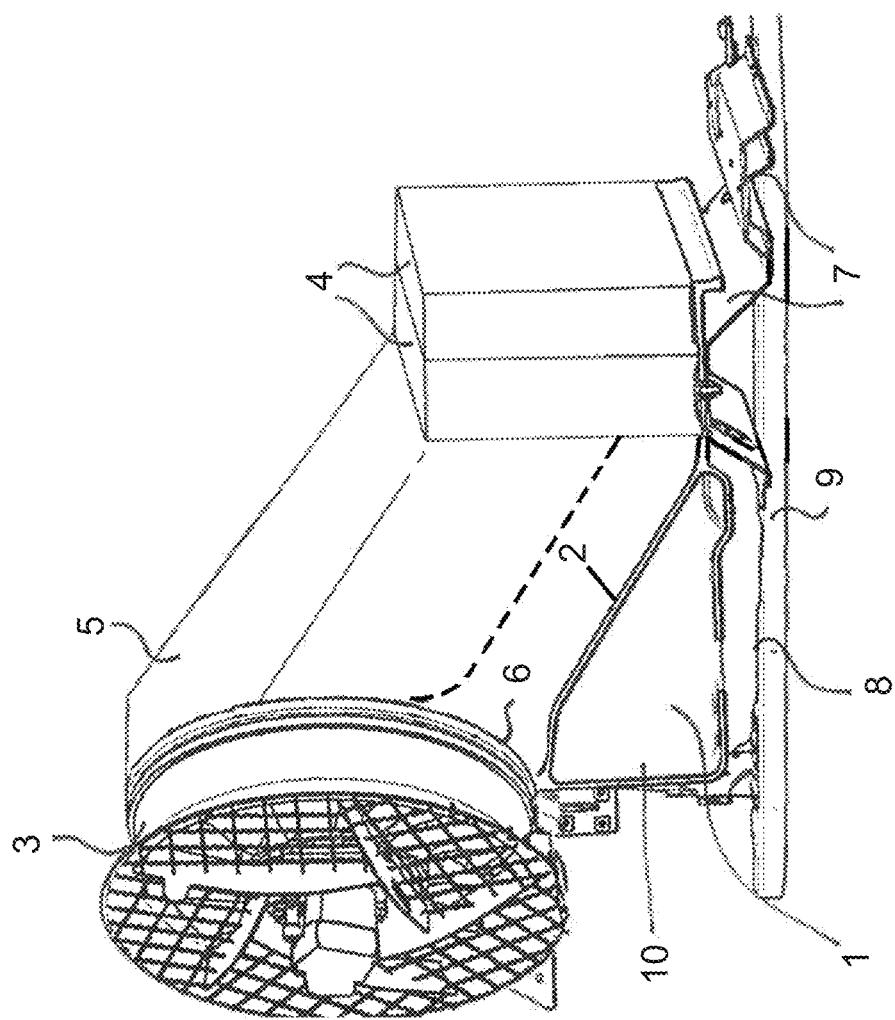
FIG. 1 is a side perspective view of a vehicle tank in accordance with the invention.

FIG. 1 is a side perspective view of a vehicle tank 1 in accordance with the invention. The tank 1 has a right angled triangular cross section defined by an upper mounting surface 2, a lower surface 8 and a vertical surface 10. Such a tank 1 is located under the bonnet (not shown) at the front of the tractor. The tank 1 is provided with an upper mounting surface on its exterior 2 to which a fan 3 and radiator or radiators 4 are mounted. Typically the fan 3 and radiator(s) 4 stand in an upright position on the upper mounting surface 2 of the tank 1. The fan 3 is located at the front of the tractor and when the bonnet is closed, air from outside enters the fan 3 through a grill in the bonnet (not shown). The fan 3 is provided with a shroud 5 which extends from the fan to the radiator(s) 4. The shroud 5 and upper mounting surface 2 form a channel which guides cooling air from the fan to the radiator(s). The fan 3, radiators 4, shroud 5 and tank 1 comprise the cooling arrangement of the tractor.

Figure 3:
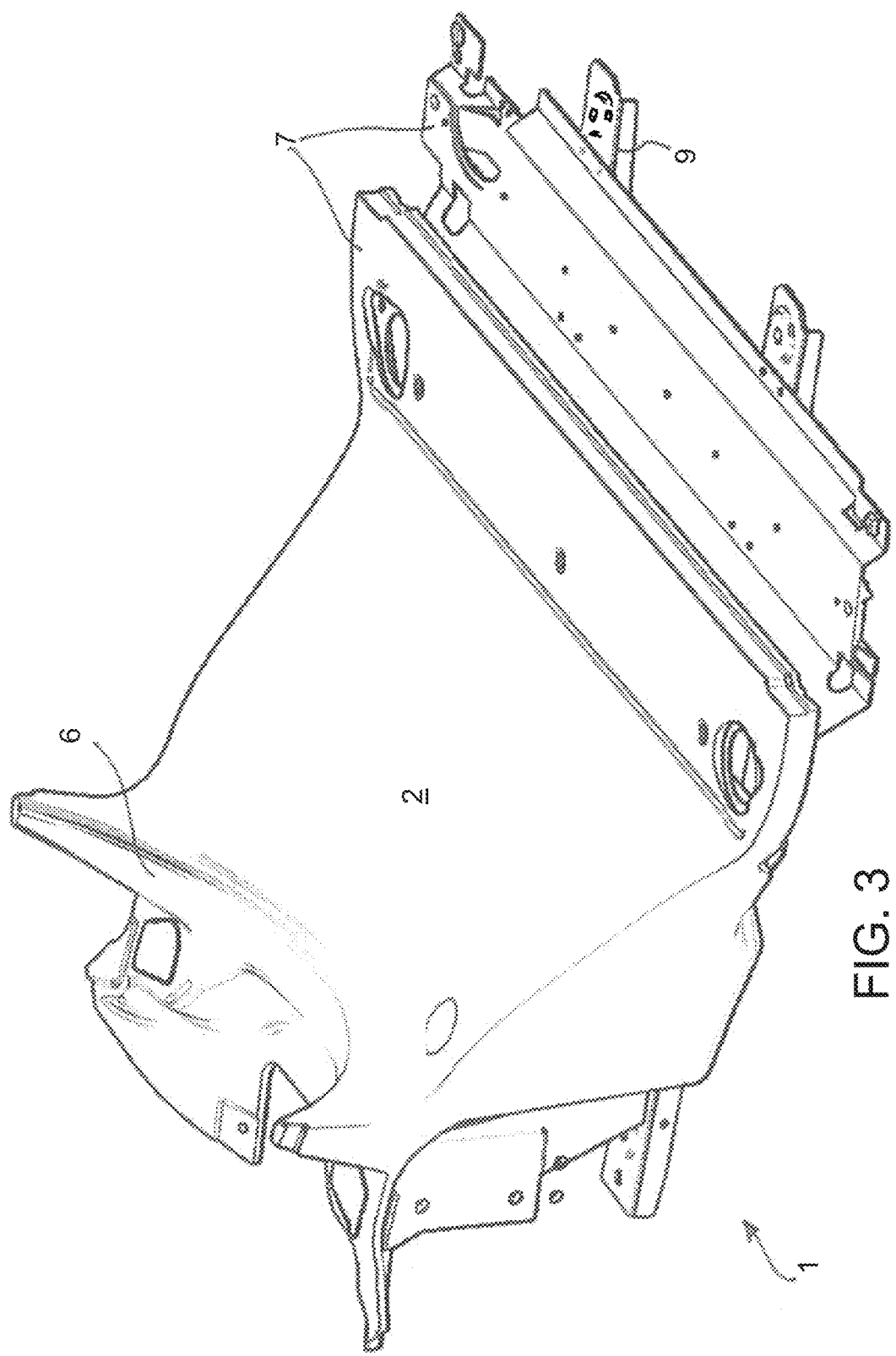
FIG. 3 is perspective view from above of the vehicle tank of FIG. 1.

Upper mounting surface 2 is sloped. Mounting surface 2 provides a fan mounting surface part 6 to which the fan is attached and a radiator mounting part 7 to which the radiator(s) is attached. Fan mounting surface part 6 may comprise a curve as shown in FIG. 3 for cooperating with the circumference of the fan. When the tank is fitted to the tractor, fan mounting surface part 6 is higher relative to the radiator mounting part 7.

Figure 2:
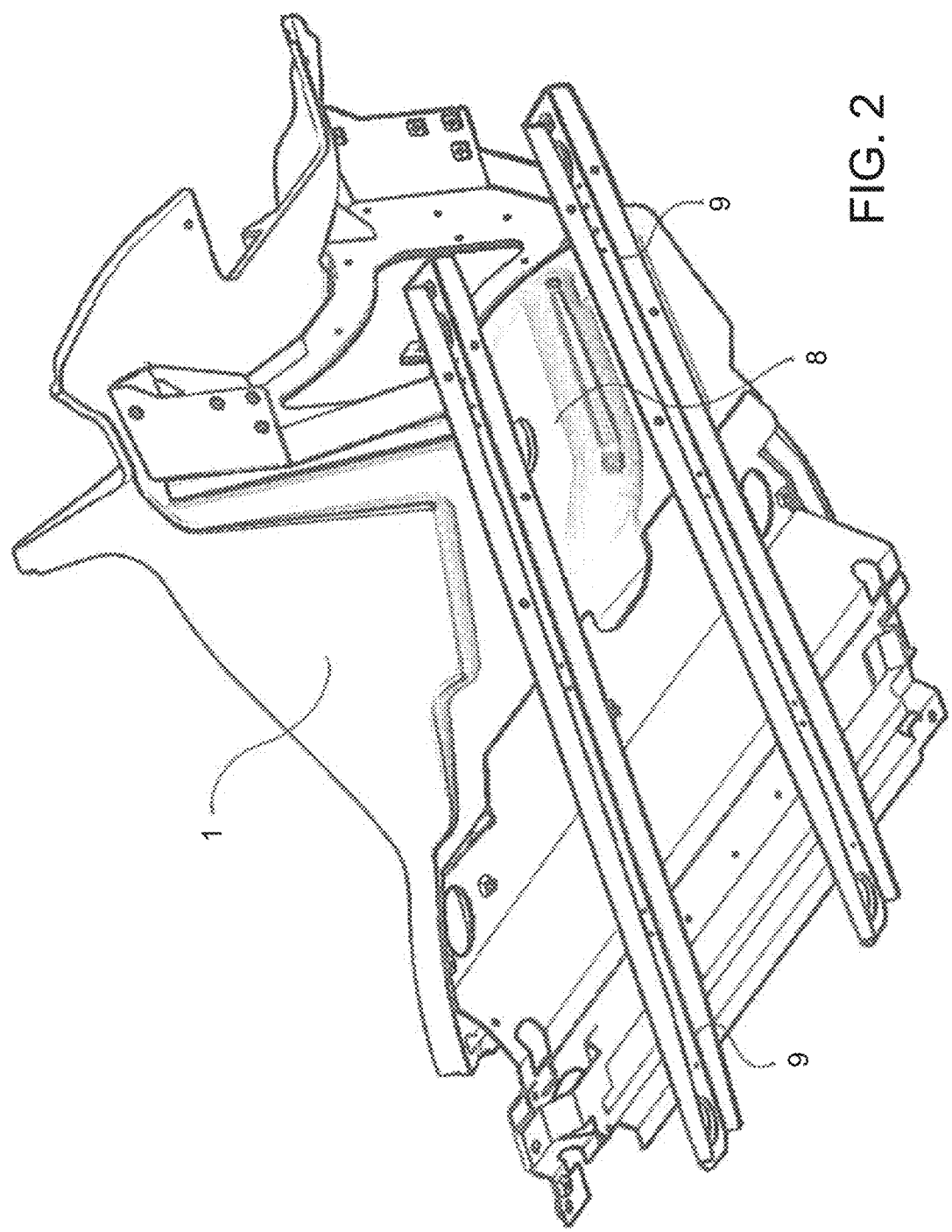
FIG. 2 is a perspective view from below the vehicle tank of FIG. 1.

Lower surface 8 of the tank 1 is the surface which forms the base of the tank and which is attached to the chassis, or frame 9 of the tractor as shown in FIG. 2. When the tank 1 is fitted to the tractor, the lower surface 8 extends in a horizontal plane across the frames. FIG. 2 shows a perspective view of the tank 1 from underneath the frame 9 looking upwards.

Vertical surface 10 connects the lower surface 8 and upper surface 2. When fitted in the tractor, vertical surface 10 lies in a generally vertical plane.

The space between the three surfaces, the upper surface 2, lower surface 8 and vertical surface 10 defines the tank 1 which is used to store fluids. For example, the tank 1 may be used to store hydraulic fluid to work the fan belt mechanism of the fan 3. Since the tank 1 sits below the fan 3, it saves having to pipe fluid from other tanks on the tractor for the fan mechanism thus saving space, time and costs during manufacture. The tank 1 is part of a cooling arrangement of the vehicle.

The tank 1 is a one piece manufactured by injection molding and allows a further 27 liters to be stored on the tractor.

The invention claimed is:

1. A cooling arrangement of a vehicle, comprising:
a fan;
a radiator; and
a tank with an upper outer surface, said upper outer surface having a sloped surface between a fan mounting surface part on which said fan is mounted, and a radiator mounting surface part on which said radiator is mounted, so that there is a difference in the relative heights of the fan mounting surface part and said radiator mounting surface part, said tank further comprising a lower outer surface having a horizontal plane for abutment with a chassis or vehicle frame, wherein a space between said upper and lower outer surfaces provides space to hold a fluid.

2. The vehicle tank as claimed in claim 1 manufactured by injection molding.

3. The vehicle tank as claimed in claim 1 wherein the vehicle is an agricultural tractor.

* * * * *